(12) United States Patent
Huang et al.

(10) Patent No.: US 9,092,241 B2
(45) Date of Patent: Jul. 28, 2015

(54) MULTI-LAYER GRAPHICS PAINTING FOR MOBILE DEVICES

(75) Inventors: Jian Huang, Sudbury, MA (US); Diego S. Rozensztejn, Brighton, MA (US); Jack Jianxiu Hao, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 750 days.

(21) Appl. No.: 12/893,566

(22) Filed: Sep. 29, 2010

(65) Prior Publication Data

US 2012/0079401 A1 Mar. 29, 2012

(51) Int. Cl.
*G06F 3/0481* (2013.01)
*G06F 9/44* (2006.01)

(52) U.S. Cl.
CPC ..................................... *G06F 9/4443* (2013.01)

(58) Field of Classification Search
CPC ........ G09G 5/377; G06F 3/408; G06F 3/0481
USPC .................................. 715/763, 766; 345/629
See application file for complete search history.

(56) References Cited

U.S. PATENT DOCUMENTS

| 6,527,812 | B1* | 3/2003 | Bradstreet | 715/210 |
| 2006/0203011 | A1* | 9/2006 | Kobayashi | 345/629 |
| 2008/0174570 | A1* | 7/2008 | Jobs et al. | 345/173 |
| 2009/0033660 | A1* | 2/2009 | Levene et al. | 345/424 |
| 2010/0318573 | A1* | 12/2010 | Yoshikoshi | 707/802 |
| 2012/0062576 | A1* | 3/2012 | Rosenthal et al. | 345/522 |

\* cited by examiner

*Primary Examiner* — Ajay Bhatia
*Assistant Examiner* — Phuong Nguyen (57) ABSTRACT

A mobile device may efficiently update a multi-layer graphic display by storing a background image representing an image of a graphic user interface displayed by the device but not including graphic elements that are in an active layer of the graphic user interface. The device may determine regions in the graphic user interface that previously corresponded to locations of the graphic elements and that no longer correspond to locations of the graphic elements; and issue one or more graphic commands to set the determined regions to be equal to corresponding regions from the background image.

19 Claims, 9 Drawing Sheets

MULTI-LAYER GRAPHICS PAINTING FOR MOBILE DEVICES

BACKGROUND INFORMATION

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

One class of mobile wireless devices, known as smartphones, may include mobile communication devices that are designed to provide additional functionality, such as the ability to execute a variety of general purpose computing applications. Although the computing performance of mobile devices, such as smartphones, continues to increase, the small physical size of a mobile device limits the resources, such as the processor speed, memory resources, and battery life, of the mobile device. Accordingly, in order to conserve mobile device resources, it is desirable that a mobile device implement applications and other processes in a manner that is as efficient as possible.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Systems and methods described herein relate to an efficient technique for updating a multi-layer graphic display on a mobile device. A snapshot image (background image) of the non-active elements of the display may be saved. Visual changes in the active elements of the display may be processed by a "paint" operation that is limited to regions of the display corresponding to the new locations of the active elements and the old "dirty" regions corresponding to the active elements. A dirty region may refer to a region in a graphic interface that was previously (e.g., after a previous graphic update) covered by an active element but is no longer covered. The dirty regions may be updated from the snapshot image. Advantageously, the entire background may not need to be repainted after each update.

Figure 1:
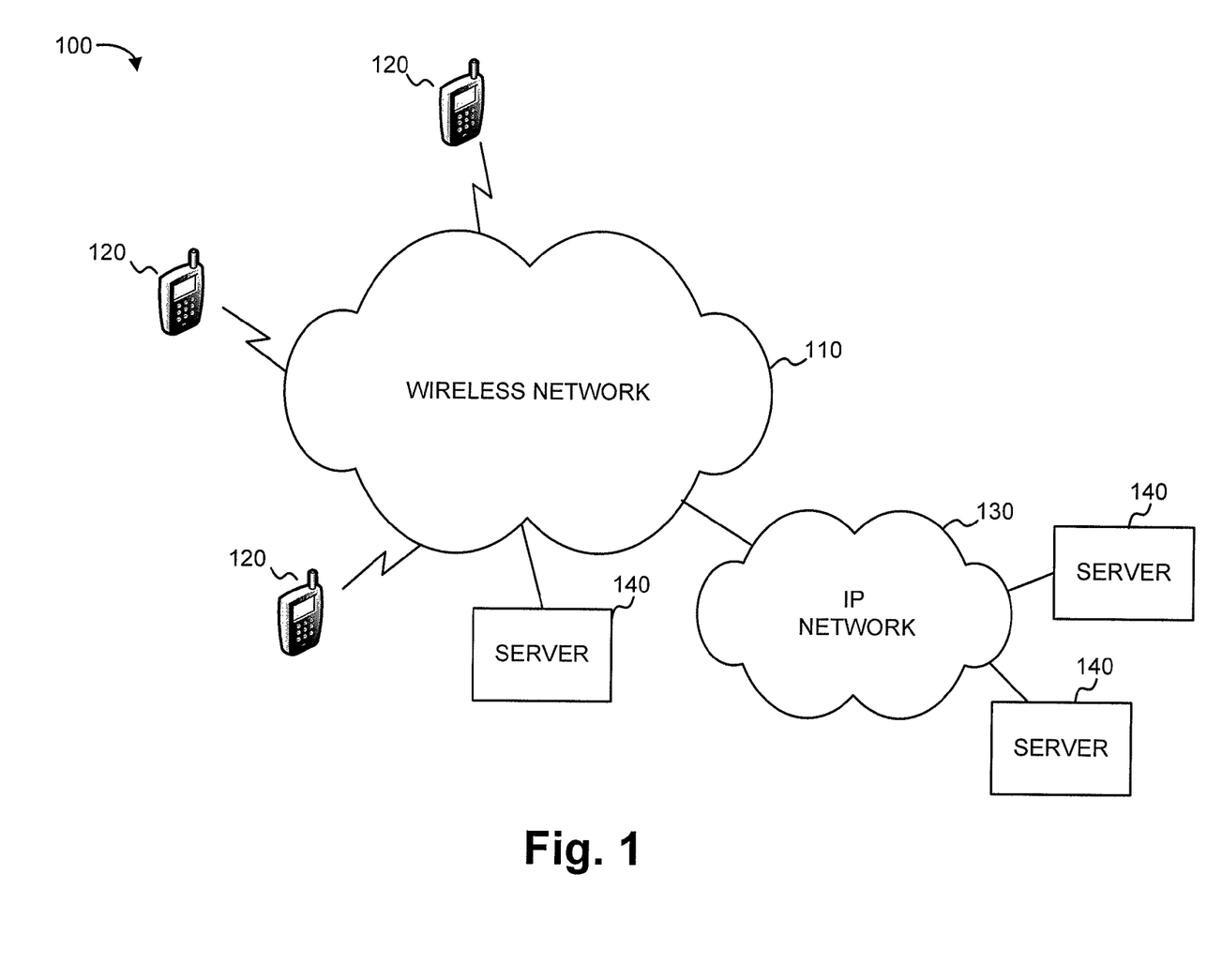
FIG. 1 is a diagram illustrating an example of a telecommunication system in which systems/methods described herein may be implemented.

FIG. 1 is a diagram illustrating an example of a telecommunication system 100 in which systems/methods described herein may be implemented. Telecommunication system 100 may include one or more networks designed to connect customer devices, such as wireless mobile devices, to one another or to other resources. System 100 is particularly shown as including a wireless network 110 and an Internet Protocol (IP) network 130. Mobile devices 120 may connect to wireless network 110. Server devices 140 may also connect to wireless network 110 and/or IP network 130. Server devices 140 may provide communication, connectivity, or other services to mobile devices 120, wireless network 110, and/or IP network 130.

Wireless network 110 may wirelessly connect mobile devices 120 to one another and to servers 140. Wireless network 110 may include access networks, which may provide the radio interfaces to mobile devices 120, and a core network portion, which may generally provide high capacity communication facilities that connect and manage the connectivity of mobile devices 120. In one implementation, wireless network 110 may include a number of possible access networks, such as the Universal Mobile Telecommunications System (UMTS) Terrestrial Radio Access Network and/or the evolved UMTS Terrestrial Radio Access Network (eUMTS). The core portion of wireless network 110 may be based on, for instance, the 3GPPP Long Term Evolution (LTE) standard.

Wireless network 110 may also include connections, such as via a gateway device, to IP network 130. Mobile devices 120 may thus connect through wireless network 110 to IP network 130.

IP network 130 may include one or more networks or sub-networks, such as a public IP packet-based network (e.g., the Internet), a private IP network, etc. In some implementations, mobile devices 120 may connect to and access resources associated with IP network 130. For example, mobile devices 120 may run a web browser application that may contact servers 140, associated with IP network 130, to view web content through the web browser application.

Mobile devices 120 may include devices designed to connect wirelessly to wireless network 110. Mobile devices 120 may include devices such as mobile telephones, smartphones, electronic notepads, and/or personal digital assistants (PDAs). Mobile devices 120 may establish wireless communication sessions with radio interface nodes in wireless network 110. The wireless communication sessions may be used for voice (e.g., telephone calls) and/or data sessions.

Server devices 140 may include devices that provide services to mobile devices 120 and/or other devices. Server device 140 may implement, for example, web servers or application servers with which mobile devices 120 may interact.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
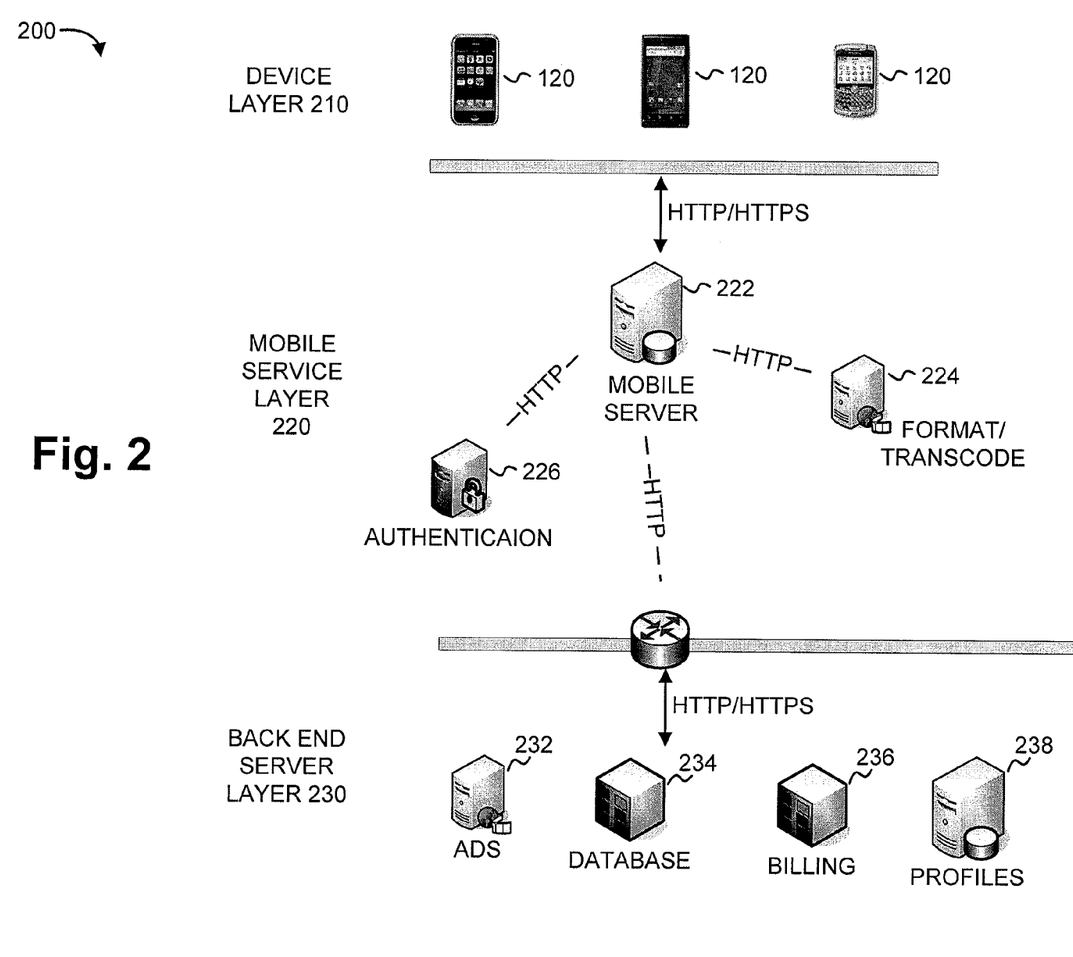
FIG. 2 is a diagram illustrating an overview of an example mobile application platform.

FIG. 2 is a diagram illustrating an overview of an example mobile application platform 200. Mobile application platform 200 may be a platform designed to allow mobile devices 120 to efficiently implement client-server applications. Mobile application platform 200 may generally include a device layer 210, a mobile service layer 220, and a back end server layer 230. Mobile service layer 220 and back end server layer 230 may be implemented as one or more server devices 140 in (or connected to) wireless network 110 or IP network 130.

Complex applications implemented at mobile devices 120 can provide unique challenges for the designers of the mobile applications. These challenges may be particularly due to mobility of the device, limited mobile device screen size, limited wireless bandwidth, unstable network connections (e.g., signal strength changes as the device is moved), limited mobile device memory resources, limited mobile device processing resources, different development platforms for different mobile device manufacturers, etc. Mobile application platform 200, by using a three-tier design that includes mobile service layer 220, may assist in standardizing the backend interface seen by application developers across multiple different mobile device types.

Device layer 210 may include mobile devices 120. Mobile devices 120 may include devices manufactured by different manufacturers. From the standpoint of the application developer, it is desirable that a consistent application interface be presented for accessing remote data and/or services, such as those provided by back end server layer 230. Mobile service layer 220 may generally provide such services, and may particularly provide services relating to, for example, mobile device specific formatting, services relating to making network requests bandwidth efficient, and/or services relating to the handling of various types and models of mobile devices 120.

Mobile service layer 220 may particularly include mobile server 222, format/transcode server 224, and authentication server 226. Mobile server 222 may include a proxy server that is accessed by mobile devices 120. Mobile server 222 may control the functionality provided by mobile service layer 220. Mobile server 222 may contact authentication server 226 and format/transcode server 224 to assist in performing the various functions provided by mobile server 222. Authentication server 226 may include logic to provide authentication services for mobile devices 120. Mobile server 222 may pass the credentials of a mobile device that is attempting to authenticate itself to authentication server 226. Mobile server 222 may use the response from authentication server 226 to determine whether to authenticate the mobile device. Format/transcode server 224 may particularly provide formatting and transcoding services. For example, format/transcode server 224 may extract or translate content between different formats or protocols. Format/transcode server 224 may be particularly used to perform formatting/transcoding when a corresponding format/transcoding function is not available on mobile device 120.

As mentioned, mobile server 222, with the assistance of authentication server 226 and/or format/transcode server 224, may act as a proxy server and may provide a number of different functions and/or services for mobile devices 120. For example, mobile server 222 may provide formatting services relating to the extraction/transcoding of content into formats suitable for different mobile devices 120. The formatting may relate to formatting suitable for a particular display device and display size. Mobile server 222 may also provide bandwidth optimization services. For example, a mobile device 120 may make multiple data calls when rendering a web page. Mobile server 222 may aggregate the data calls into a format that is efficient for the network, and may perform data caching, aggregation, and compression to increase the perceived performance of mobile device 120. Mobile server 222 may additionally perform functions relating to the normalization of protocols or standards used by different types or different models of mobile devices 120. For example, mobile server 222 may convert content appropriate for different screen sizes, media formats, etc.

Back end server layer 230 may include one or more server devices that may be accessed, through mobile server 222, by mobile devices 120. As shown, these servers may include an advertisement (AD) server 232, a database 234, a billing server 236, and a profile server 238.

Advertisement server 232 may include a server that stores advertisements that may be presented by mobile devices 120. An application running on a mobile device 120 may, for instance, request a new advertisement. Advertisement server 232 may send an appropriate advertisement to mobile device 120, which may present the advertisement to the user.

Database 234 may include one or more databases that may be accessed by mobile devices 120. Certain applications on mobile devices 120 may be implemented as applications that store and/or retrieve information using a remote database. For example, database 234 may be used by applications to provide remote storage of pictures or videos or may be used in a social media application.

Billing server 236 may provide billing services to mobile devices 120. Mobile devices 120 may use billing server 236 to track and charge for services provided to the user of the mobile device.

Profile server 238 may store user profiles for mobile devices 120. Mobile devices may, for instance, access profile server 238 to obtain information relating to the user of the mobile device.

Although FIG. 2 shows example components of mobile application platform 200, in other implementations, mobile application platform 200 may include fewer components, different components, differently arranged components, or additional components than depicted in FIG. 2. Additionally or alternatively, one or more components of mobile application platform 200 may perform the tasks described as being performed by one or more other components of mobile application platform 200.

Figure 3:
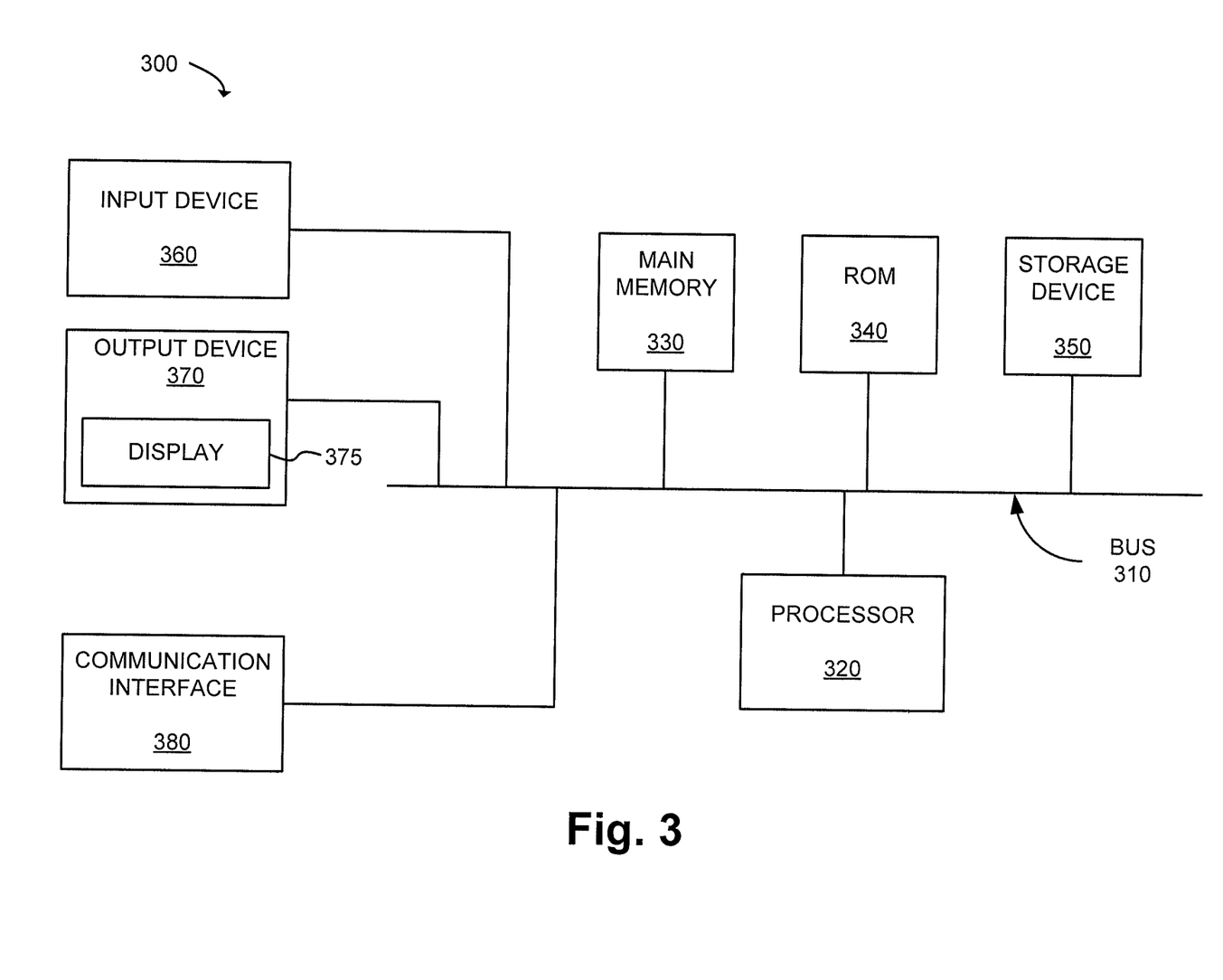
FIG. 3 is a diagram illustrating example components of a device.

FIG. 3 is a diagram illustrating example components of a device 300, which may correspond to a network device (e.g., mobile server 222, format/transcode server 224, authentication server 226, advertisement server 232, database 234, billing server 236, or profile server 238) or a mobile device 120. As shown in FIG. 3, device 300 may include a bus 310, a processor 320, a main memory 330, a read only memory (ROM) 340, a storage device 350, an input device 360, an output device 370, and a communication interface 380.

Bus 310 may include a path that permits communication among the components of device 300. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to device 300, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. When device 300 corresponds to a mobile device, output device 370 may particularly include a display 375. Communication interface 380 may include any transceiver-like mechanism that enables device 300 to communicate with other devices and/or systems. For example, communication interface 380 may include mechanisms for communicating with another network device.

As will be described in detail below, device 300 may perform certain operations relating to updating a display of a mobile device. Device 300 may perform these and other operations in response to processor 320 executing software instructions contained in a computer-readable medium, such as main memory 330. A computer-readable medium may be defined as a non-transitory memory device. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 illustrates example components of device 300, in other implementations, device 300 may include additional, fewer, different, or differently arranged components than those illustrated in FIG. 3 and described herein.

Figure 4:
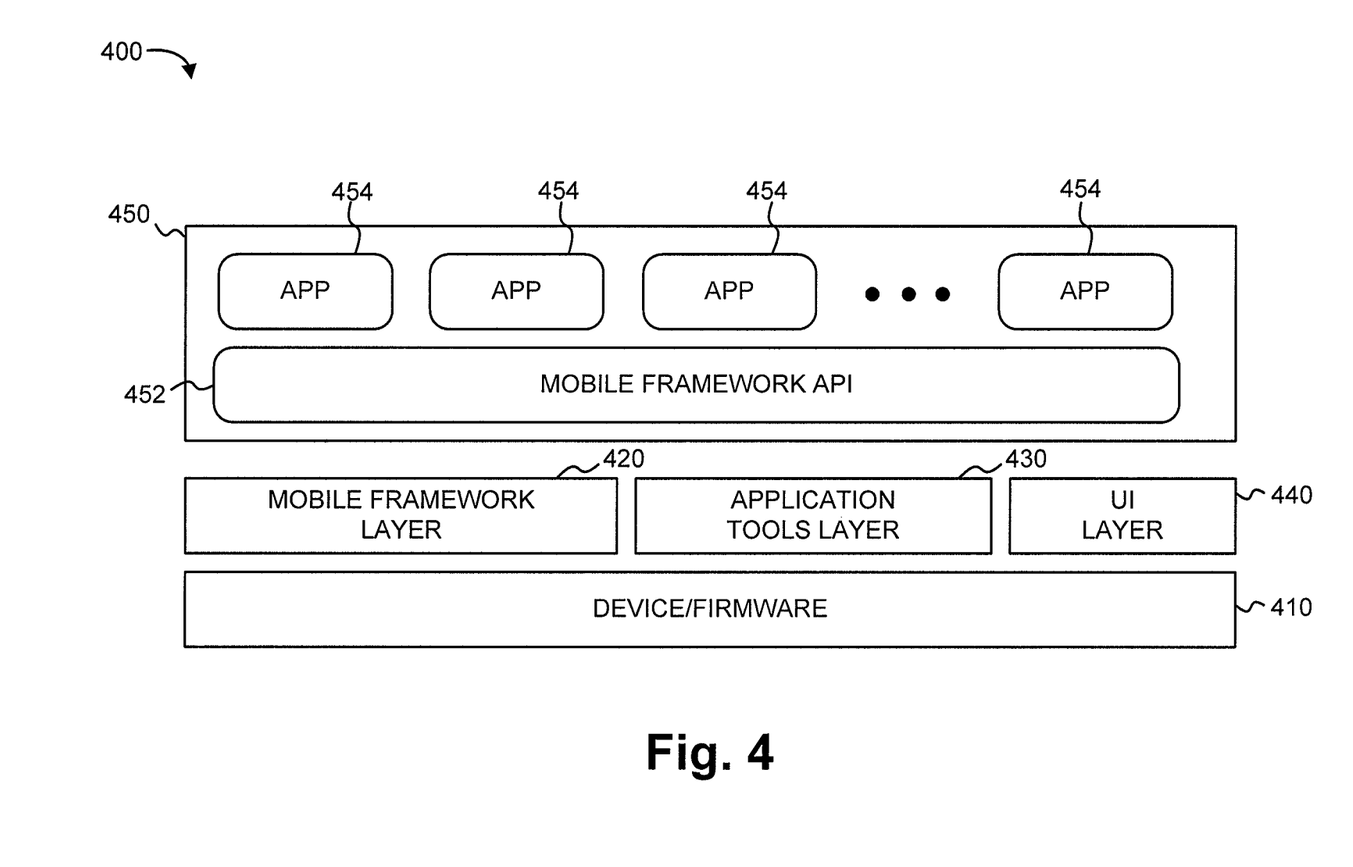
FIG. 4 is a diagram illustrating an example of a software architecture of a mobile device.

FIG. 4 is a diagram illustrating an example of a software architecture 400 of a mobile device 120. Software architecture 400 may include a number of layered software components. The layered components are particularly shown as device/firmware layer 410, mobile framework layer 420, application tools layer 430, user interface (UI) layer 440, and application layer 450. Application layer 450 may additionally include mobile framework application programming interface (API) 452 and one or more applications 454. In general, software architecture 400 may allow for the separation of the application framework and business logic elements of mobile device 120 from the user interface and application logic.

Device/firmware layer 410 may include logic to implement and control the low level functionality of mobile device 120. Device/firmware layer 410 may, for example, include logic to control, at a low level, graphics, network communication, security, and/or other aspects of mobile device 120. Device/firmware layer 410 may particularly include a graphics controller.

Mobile framework layer 420 may include logic to encapsulate the application framework and business logic of mobile device 120. Separating the application framework and business logic from the application and user interface layer may enable a more flexible development environment. Mobile framework layer 420 may provide common functions for providing, for example, advertisements, form handling, profile settings, notifications, network services, and thread pooling.

Application tools layer 430 may provide a number of services for application layer 450, including authentication services, purchasing and account balance management services, and/or other services that may be required to be present for applications installed in mobile device 120. Application tools layer 430 may also include business logic implementation components that provide business rules or content that may be displayed by UI layer 440, such as content relating to standardized interfaces for authentication, settings/profile management, catalog search/browse, or purchasing. In general, application tools layer 430 may provide the services required to be provided by applications 454.

UI layer 440 may provide services relating to user interface updating. Application layer 450 may transmit UI update requests to UI layer 440, which may communicate with device/firmware layer 410 to update display 375 of mobile device 120 (e.g., an LCD display implemented as part of output device 370). Consistent with aspects described in more detail below, UI layer 440 may implement an efficient multi-layer graphics repainting technique to enable fast and resource efficient repainting of display 375.

Application layer 450 may include one or more applications 454. Applications 454 may be applications with which users of mobile devices 120 may interact. Applications 454 may include, for example, an email application, a music player application, a photo viewer application, a text editor application, etc. Applications 454 may be applications that are installed by the manufacturer of mobile device 120 or applications that may be developed by third-party developers and downloaded to mobile device 120 by users. Applications 454 may communicate with mobile framework API 452, which may present a common API through which application developers may create applications 454.

Although FIG. 4 illustrates an example a software architecture 400, in other implementations, software architecture 400 may include additional, fewer, different, or differently arranged components than those illustrated in FIG. 4 and described herein.

Figure 5:
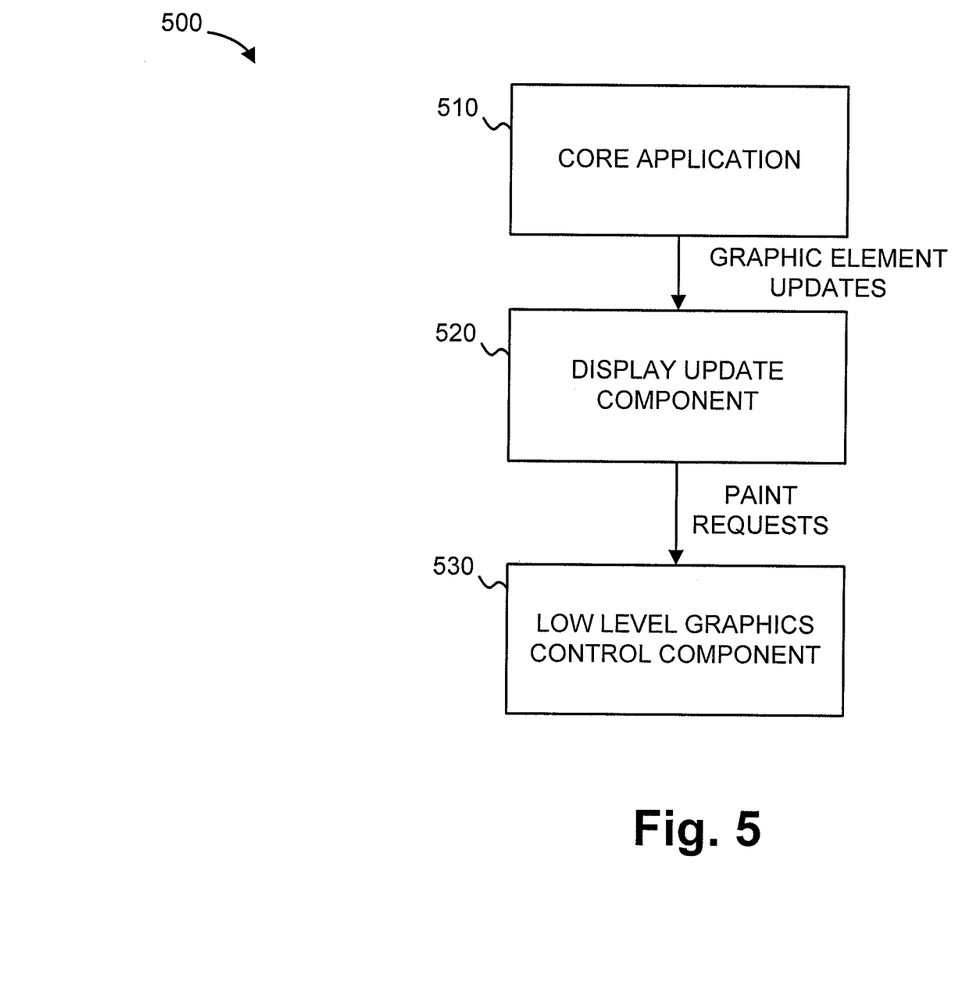
FIG. 5 is a diagram illustrating an example of functional components in a multi-layer graphics repainting operation.

As mentioned above, UI layer 440 may implement a multi-layer graphics repainting technique to enable fast and resource efficient repainting of display 375 of mobile device 120. FIG. 5 is a diagram illustrating an example of functional components 500 in a multi-layer graphics repainting operation.

Functional components 500 may include core application 510, display update component 520, and low level graphics control component 530. Core application 510 may include the software instructions that implement the end-user application. In the context of FIG. 4, core application 510 may correspond to application 454. In some implementations, core application 510 may represent an application 454 and mobile framework API 452.

As part of the user interface presented by core application 510, core application 510 may maintain a number of graphic elements. The graphic elements may include user interface "widgets" such as windows, panels, check boxes, drop down lists, scrolling panels, etc. The graphic elements may be implemented using a "container and component" design pattern in which certain graphic elements may be contained within other graphic elements. For example, an application window may contain a panel arranged in the lower half of the window. The panel may itself include other graphic elements, such as a picture box or list box. Core application 510 may update these graphic elements to implement the user interface for core application 510.

Display update component 520 may process graphic element updates received from core application 510. In the context of FIG. 4, display update component 520 may correspond to, for example, UI layer 440. In alternative implementations, display update component 520 may be implemented in other logical layers, such as within mobile framework API 452 or device/firmware layer 410. Display update component 520 may generally operate to process the graphic element updates received from core application 510 and convert the updates into a format compatible with the lower level graphics hardware of mobile device 120. Display update component 520 may particularly convert the graphic element updates into paint requests understandable by the lower level graphics hardware of mobile device 120. Display update component 520 may additionally apply optimizations to increase the efficiency with which graphic element updates are handled by the hardware of mobile device 120. As described in more detail below, display update component 520 may implement a multi-layer graphics painting technique to enable fast and resource efficient repainting of display 375 of a mobile device.

In an alternative implementation, the graphics paint techniques described herein as being performed by display update component 520 may alternatively be performed by core application 510. In this implementation, functional components 500 may include only core application 510 and low level graphics control component 530.

Low level graphics control component 530 may handle the paint requests from display update component 520 and, in response, update display 375 as appropriate. In one implementation, low level graphics control component 530 may correspond to logic in device/firmware 410, such as a specialized graphic processor.

As mentioned, the graphic elements maintained by core application 510 may conform to a container and component design pattern. Graphic elements that are contained within another graphic element may be conceptualized as being in a higher graphical layer. When updating the display, the lowest graphical layer (i.e., the background layer) may be painted first, followed by each higher layer. In this manner, higher graphical layers may appear on top of lower graphical layers.

Figure 6:
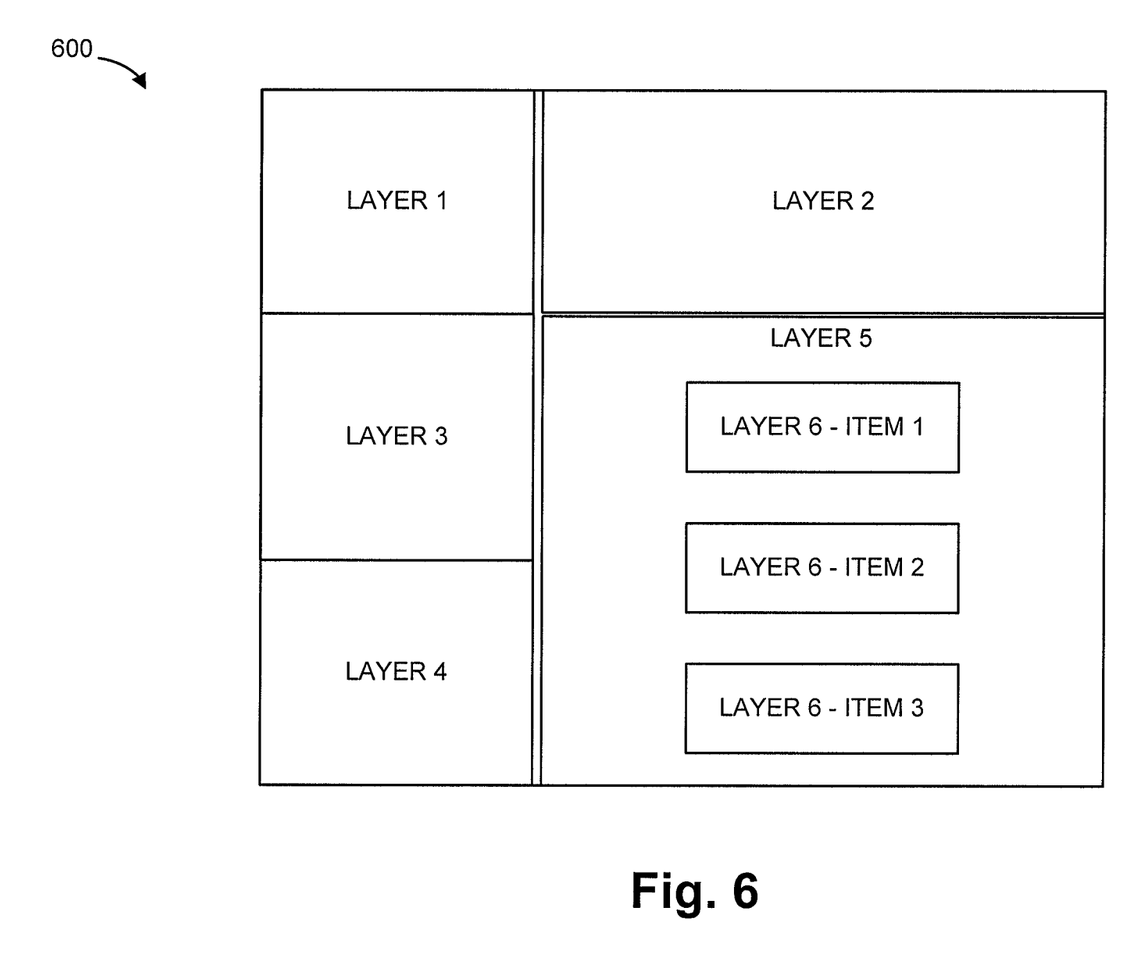
FIG. 6 is a diagram illustrating an example of a graphical interface that includes a number of layers.

FIG. 6 is a diagram illustrating an example of a graphical user interface 600 that includes a number of layers. Graphical user interface 600 may be presented on, for example, display 375 of mobile device 120.

Six layers are particularly shown in FIG. 6, labeled as layers 1 through 6. Layers 1 through 4 are shown positioned in a non-overlapping manner in graphical user interface 600. Layer 6, however, is contained by layer 5. In other words, layer 6 should be painted on top of layer 5. In this example, assume layer 6 is a list that includes three items. Based on user selection, the items of layer 6 may scroll relative to layer 5.

Figure 7:
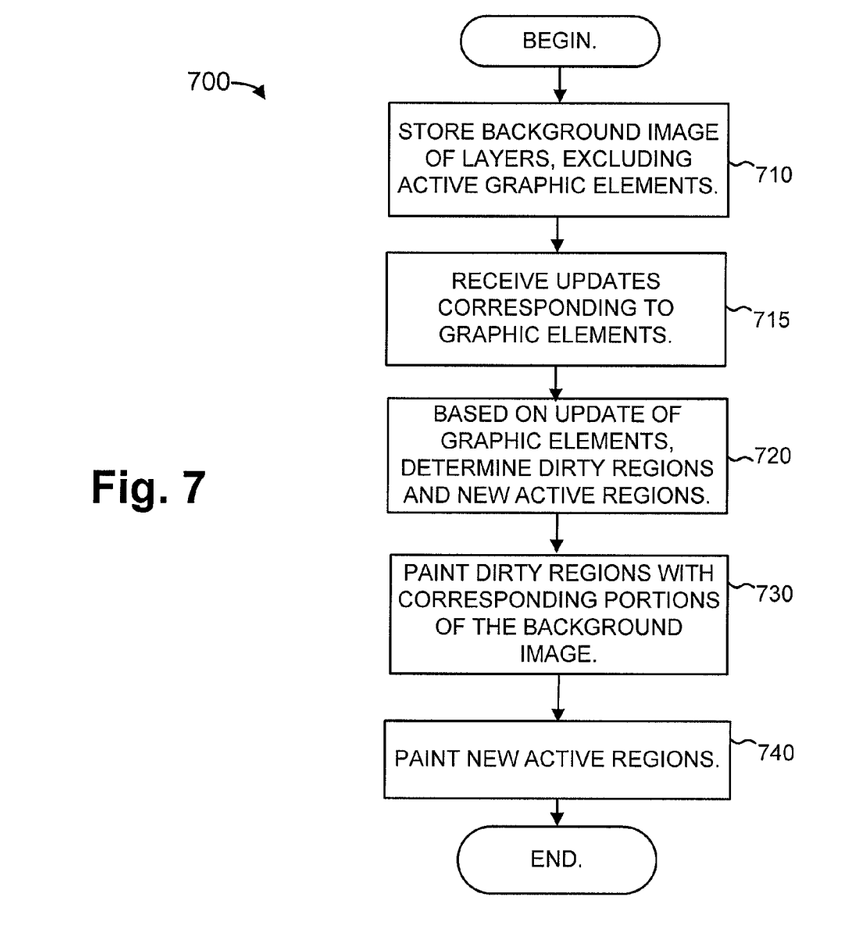
FIG. 7 is a flow chart illustrating an example process for implementing a multi-layer graphics painting technique.

FIG. 7 is a flow chart illustrating an example process 700 for implementing a multi-layer graphics painting technique. The operations of FIG. 7 may be performed by, for example, display update component 520.

Process 700 may include storing a background image of the layers in the graphical user interface, excluding the active graphic elements from the background image (block 710). The background image may be a snapshot of all of the layers except those that include active graphical elements (i.e., the layer being updated or that contain graphic elements that are being updated by the application). In the example of FIG. 6, assume that the graphic elements in layer 6 are being manipulated by the application. Layer 6 may thus be a layer that includes active graphical elements. The other layers, layers 1-5, may be considered the background layers. An image corresponding to the image rendered based on layers 1-5 may be stored as the background image. The active layer, layer 6, when it is updated, may be updated on top of the background image.

At some point, the active application (i.e., core application 510), may update the graphic elements under its control (i.e., the active graphical elements). For example, the active application may modify a visual property of one or more active graphical elements. For example, during a scroll operation on a list, the displayed list items may change. Display update component 520 may receive or intercept the updates corresponding to the graphic elements (block 715).

Process 700 may further include determining, based on the update of the active graphic elements, "dirty regions" and regions corresponding to the updated active graphic elements (block 720). A dirty region may refer to a region on display 375 that was previously (e.g., after the previous graphic update) covered by an active graphic element but that is now part of the background layer (i.e., a region no longer covered by an active graphical element). A dirty region may be exposed when an active graphic element moves on display 375. The regions corresponding to the updated active graphic elements may include the region(s) associated with the "new" locations of the active graphic elements (i.e., regions covered by the updated graphic elements).

Process 700 may further include painting the dirty regions with the corresponding portions of the background image (block 730). By painting the dirty regions, the background may be effectively "restored" to its correct state. The paint operation may be implemented by display update component 520 using, for example, an API graphic call operation or another type of graphic call operation. For example, the paint operation may be submitted as a paint request to low level graphics control component 530. In general, a "paint" operation may refer to any request from one component to another to update or refresh a portion of a graphic interface.

Process 700 may further include painting the new active regions of display 375 based on the updated active graphic elements (block 740). The updated active graphic elements may thus be painted to update their most recent state. The paint operation may be implemented by display update component 520 using, for example, an API graphic call operation or another type of graphic call operation. For example, the paint operation may be submitted as a paint request to low level graphics control component 530. In one implementation, block 740 may correspond to issuing an update or repaint operation for the active graphical elements. In some implementations, the paint operations performed in blocks 730 and 740 may be combined and performed in a single operation.

Figure 8:
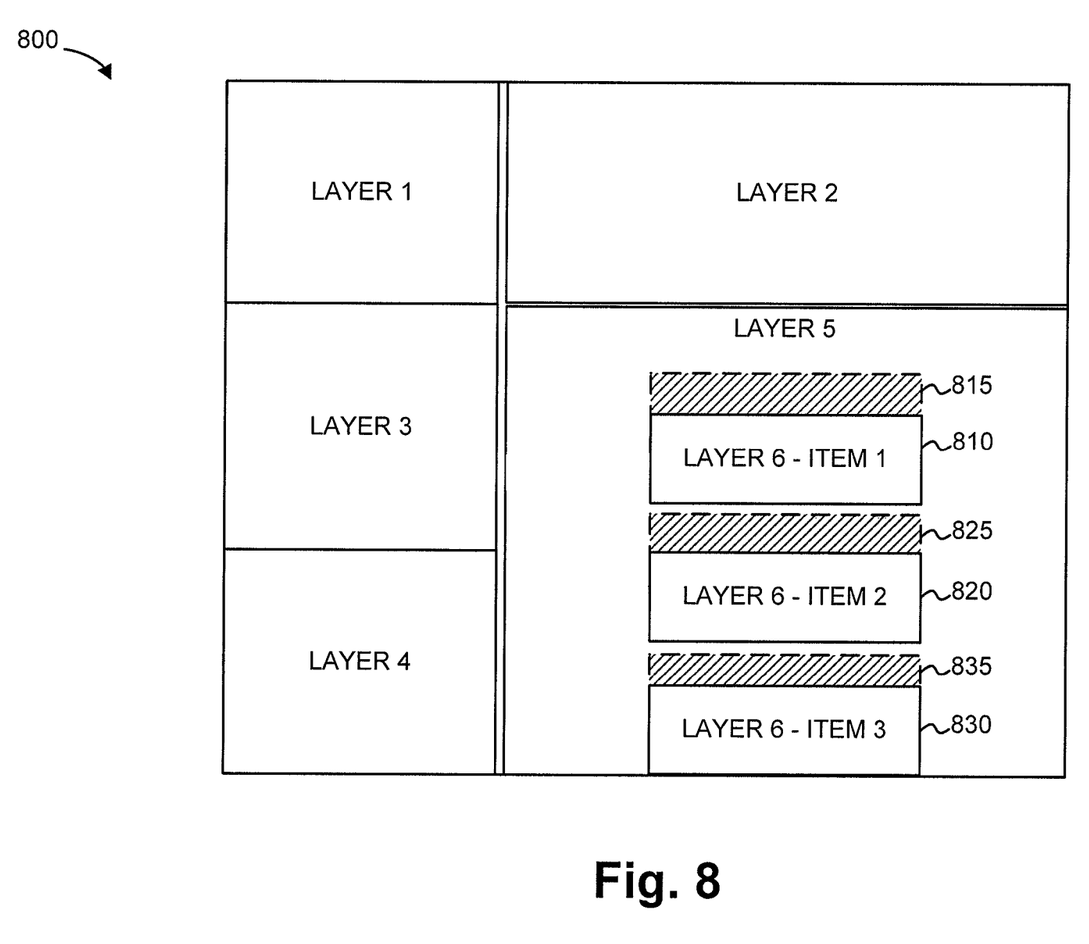
FIG. 8 is a diagram illustrating an example of a graphical interface illustrating dirty regions.

FIG. 8 is a diagram illustrating an example of a graphical interface 800 illustrating dirty regions. Graphical interface 800 may represent graphical interface 600 after an update of the active graphic elements (i.e., items 1, 2, and 3 of layer 6). As shown, layer 6 includes three active graphical elements, graphical elements 810 (ITEM 1), 820 (ITEM 2), and 830 (ITEM 3). The previous locations of graphical elements 810, 820, and 830 are illustrated by hatched rectangles 815, 825, and 835, respectively. Hatched rectangles 815, 825, and 835 may represent the dirty regions (i.e., the dirty regions determined in block 720). As performed in block 730 (FIG. 7), these dirty regions may be painted to copy the corresponding sections of the background image (i.e., the image rendered by layer 5) over the dirty regions. As previously mentioned, instead of updating the entire background, in response to an update of the active graphical elements, in block 730, only hatched rectangles 815, 825, and 835 may be updated.

In one implementation, the dirty regions, such as those corresponding to hatched rectangles 815, 825, and 835 may be identified as minimum sized rectangles that bound the dirty regions of the graphic user interface. In this implementation, the updating of the dirty regions may correspond to paint operations that copy rectangular regions of the background image to the active layer.

Figure 9A:
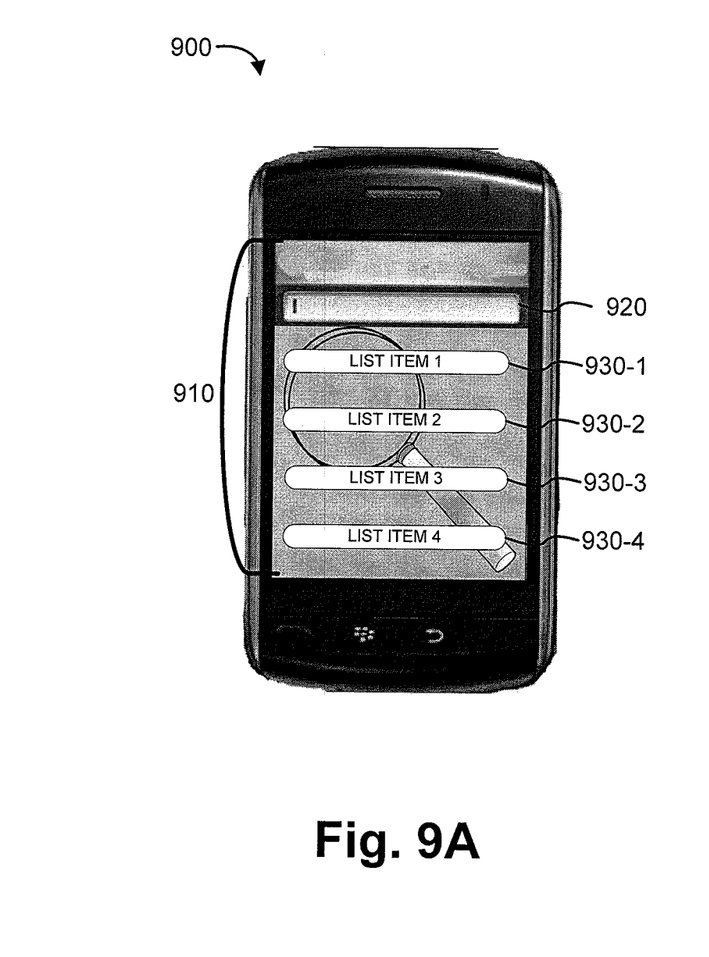
FIGS. 9A and 9B are diagrams of an example of a mobile device having a display that may be updated using techniques discussed herein.
Figure 9B:
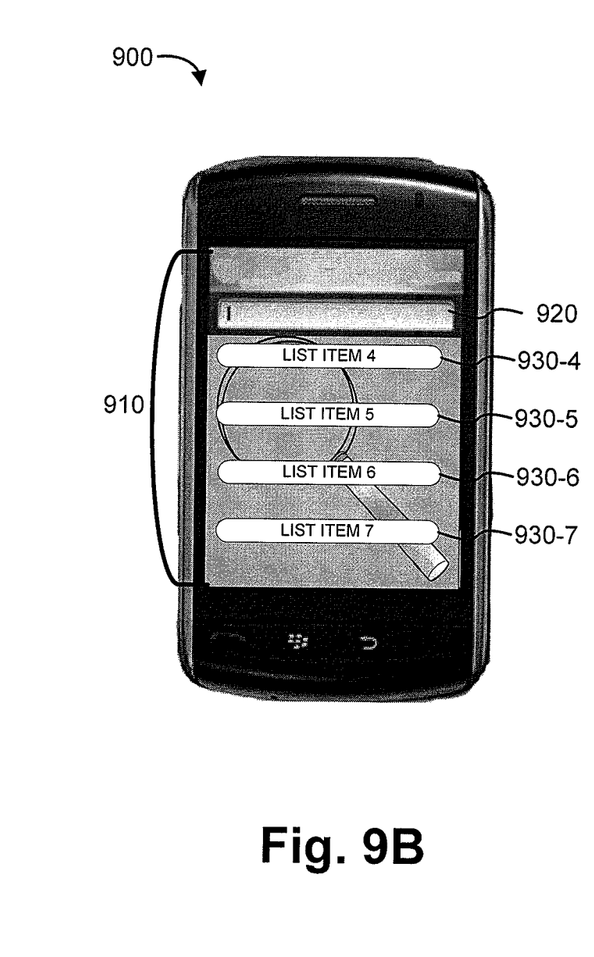

FIGS. 9A and 9B are diagrams of an example of a mobile device 900, having a display 910, that may be updated using the techniques discussed above. In this example, assume that display 910 of mobile device 900 presents a scrollable list to the user. The list may be a list of results that correspond to a search query entered in a search box 920 by the user. In FIG. 9A, a number of list items 930-1, 930-2, 930-3, and 930-4 (i.e., search results) are presented to the user in the form of a scrollable list. In FIG. 9B, assume that the user has scrolled this list so that result 930-4 is near the top of display 910 and additional list items 930-5, 930-6, and 930-7 are shown.

The techniques discussed previously to perform a multi-layer graphics painting may be used to update display 910 in response to the list scroll operation illustrated in FIG. 9B. In FIGS. 9A and 9B, for example, the background presented behind list items 930 may remain constant. Accordingly, when updating display 910, portions of display 910 may be updated based on the previous position (i.e., before the scroll operation) and the current position (i.e., after the scroll operation) of list items 930. The previous position of the list items may correspond to the dirty regions and the current position may correspond to the new active regions. The background presented behind list items 930 may correspond to the background image. Instead of needing to update, in response to an update of list items 930, the whole display 910 (including the entire background image), only the dirty and active regions may need to be painted.

As particularly described above, a graphics display update operation is described in which, instead of redrawing an entire screen for each update/refresh operation, only affected regions may be updated. Advantageously, fewer resources of mobile device 120 may be used in updating the display than may otherwise be used. The techniques described herein may be particularly applicable to certain graphic effects such as a scrolling list or other graphic effects (e.g., an object drag and drop operation).

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIG. 7, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A mobile device implemented method comprising:
displaying, by the device, displaceable graphic elements over a non-displaceable background image in a non-active layer of a graphic user interface, displayed by the device, the non-displaceable background image including covered regions displaying the displaceable graphic elements in an active layer of the graphic user interface;
at least one of scrolling or dragging, by the device, one or more of the displaceable graphic elements to partially uncover one or more of the covered regions;
determining the one or more partially uncovered regions based on a minimum size of one or more shapes that bound the one or more of the displaceable graphic elements; and
issuing, by the device, one or more graphic commands to copy the one or more shapes from the background image to the active layer of the graphic user interface to visually render the one or more partially uncovered regions, without updating of an entirety of the non-displaceable background image, to display corresponding regions of the non-displaceable background image while other regions of the non-displaceable background image remain constant.

2. The method of claim 1, further comprising:
determining second regions in the active layer of the graphic user interface that correspond to locations of updated displaceable graphic elements relative to the background image; and
issuing one or more additional graphic commands to update the second regions.

3. The method of claim 1, wherein the one or more graphic commands include paint commands related to a drag and drop operation.

4. The method of claim 1,
wherein the one or more shapes comprise one or more rectangles.

5. The method of claim 1, wherein the device includes a mobile device configured to receive the displaceable graphic elements in response to a search query, using the graphic user interface, over a wireless network via a mobile service layer.

6. The method of claim 1, wherein the displaceable graphic elements conform to a container and component design pattern in which first ones of the displaceable graphic elements are contained within second ones of the displaceable graphic elements.

7. The method of claim 1, wherein the background image includes the non-displaceable background image presented via a plurality of non-active layers of the graphic user interface.

8. The method of claim 1, wherein the displaceable graphic elements correspond to scrollable objects.

9. A mobile device comprising:
a display;
one or more processors; and
a memory to store instructions that cause the one or more processors to:
determine, in response to an operation to update a rendering of displaceable graphic elements in an active layer of the display, dirty regions rendered in a non-active layer of the display as regions of a background image that have been exposed by at least one of scrolling or dragging at least one of the displaceable graphic elements relative to the background image, based on a minimum size of one or more shapes that bound the at least one of the displaceable graphic elements;

update the rendering of the at least one of the displaceable graphic elements, on the display, based on a current location of the at least one of the displaceable graphic elements; and update the dirty regions rendered on the display based on portions of the background image corresponding to the display by copying the one or more shapes from the background image to the active layer, without change to portions of the background image which are unrelated to the update of the rendering of the at least one of the displaceable graphic elements.

10. The mobile device of claim 9, wherein the memory stores instructions to additionally cause the one or more processors to:

store the background image as an image representing multiple graphic layers below the active layer.

11. The mobile device of claim 9, wherein, when updating the rendering of the at least one of the displaceable graphic elements and updating the dirty regions, the one or more processors are to:

issue at least one paint command limited to the current location of the at least one of the displaceable graphic elements and the dirty regions.

12. The mobile device of claim 9, wherein the one or more shapes comprise one or more rectangles.

13. The mobile device of claim 9, wherein the displaceable graphic elements conform to a container and component design pattern in which first ones of the displaceable graphic elements are contained within second ones of the displaceable graphic elements.

14. The mobile device of claim 9, wherein the background image includes a non-displaceable image presented via a plurality of non-active graphic layers on the display.

15. The mobile device of claim 9, further comprising a communication interface configured to receive the displaceable graphic elements in response to a search query.

16. A non-transitory computer-readable media containing instructions, for execution by a processor, the instructions including:

instructions to store a background image representing a non-displaceable image in a non-active layer of a graphic user interface displayed by a device, including covered regions displaying displaceable graphic elements that are in an active layer of the graphic user interface;

instructions to at least one of scroll or drag one or more of the displaceable graphic elements from one or more of the covered regions to one or more uncovered regions in the non-active layer of the graphic user interface;

instructions to determine the one or more uncovered regions in the graphic user interface that previously corresponded to locations of the displaceable graphic elements and that are no longer covered by the one or more displaceable graphic elements, based on a minimum size of one or more shapes that bound previous locations of the one or more displaceable graphic elements; and instructions to issue one or more graphic commands to copy the one or more shapes from the stored background image to the active layer of the graphic user interface to render the determined one or more uncovered regions, without updating of an entirety of the background image, to display corresponding regions of the non-displaceable image while other regions of the non-displaceable image remain unchanged.

17. The non-transitory computer-readable media of claim 16, wherein the one or more shapes comprise rectangles.

18. The non-transitory computer-readable media of claim 16, wherein the device includes a mobile device configured to receive the displaceable graphic elements in response to a search query, using the graphic user interface, over a wireless network via a mobile service layer.

19. The non-transitory computer-readable media of claim 16, wherein the displaceable graphic elements conform to a container and component design pattern in which first ones of the displaceable graphic elements are contained within second ones of the displaceable graphic elements.

* * * * *